United States Patent [19]
Sheaffer

[11] Patent Number: 5,980,075
[45] Date of Patent: Nov. 9, 1999

[54] FIBER OPTICS ILLUMINATION SYSTEM FOR PLASTIC LIGHT FIBER

[76] Inventor: Clifford G. Sheaffer, 136 Teton Dr., Pittsburgh, Pa. 15239

[21] Appl. No.: 09/031,161

[22] Filed: Feb. 26, 1998

[51] Int. Cl.[6] .............................. F21V 8/00; G02B 6/04
[52] U.S. Cl. ...................... 362/556; 362/580; 362/307; 385/115; 385/901
[58] Field of Search .................................. 362/551, 554, 362/556, 559, 560, 580, 581, 294, 306, 307; 385/52, 115, 116, 119, 120, 123, 901

[56] References Cited

U.S. PATENT DOCUMENTS

| | | | |
|---|---|---|---|
| 5,099,399 | 3/1992 | Miller et al. | 362/32 |
| 5,259,056 | 11/1993 | Davenport et al. | 385/115 |
| 5,347,433 | 9/1994 | Sedlmayr | 362/554 |
| 5,513,291 | 4/1996 | Buchin et al. | 385/93 |
| 5,746,494 | 5/1998 | Koeda et al. | 362/560 |

*Primary Examiner*—Alan Cariaso
*Attorney, Agent, or Firm*—Carothers & Carothers

[57] ABSTRACT

A fiber optics illumination system for plastic fiber bundle light guides which have pliable cores with one or more cladding sleeves. The proximal light receiving end of the light guides are stripped of all cladding to expose their pliable bundled cores pressed against a mirror mask plate which has a central transparent portion to transmit light from the light source therethrough to the fiber ends for transmission. A vice mechanism is provided to adjust the pressure of the pliable fiber core ends against the mirror mask. Surfaces of the mirror mask which do not transmit light directly to the proximal fiber ends are provided with a light reflecting or mirrored surface to reflect all unused light and heat away from the interface of the mirror mask and the fiber ends.

12 Claims, 2 Drawing Sheets

FIBER OPTICS ILLUMINATION SYSTEM FOR PLASTIC LIGHT FIBER

BACKGROUND OF THE INVENTION

This invention relates to the field of fiber optics illumination systems, and more particularly to illuminators that provide a source of illumination for plastic fiber bundle light guides of the type having a soft pliable polymeric core.

The present invention pertains particularly to flexible plastic fiber light guides or light pipes of the type having a central soft and pliable polymeric core with one or more cladding sleeves applied thereover. A specific example is the plastic flexible light pipe manufactured under the trademark Optiflex by Rohm and Haas Company of Bristal, Pa.

The soft pliable polymeric core is a trade secret composition of Rohm and Haas Company and this core is immediately cladded with a clear Teflon sleeve or sheathing, which in turn is covered with a white plastic cladding.

The advantage of such plastic flexible light pipe is that the light pipe or fiber is extremely flexible when compared to glass fiber and to other stiffer plastic fibers. Accordingly, larger diameter light pipes or fibers may be utilized in the bundle. For example, Rohm and Haas Company manufactures such a flexible light pipe designated as 7100-IEWS light pipe which has a 7 mm diameter light pipe sheathed with a white plastic cladding having an outside diameter of approximately 9 mm.

Such plastic optical fibers are not only desirable to use because of their flexibility and size, but also because of the quality and character of the light transmitted by such light pipes. However, such plastic fiber optics are more susceptible to heat damage than glass fibers. Polymerized fiber optics or light pipes deteriorate quickly when exposed to high heat and oxygen. They turn yellow and then brown if the heat applied to the light receiving distal ends of the fibers is exposed to excessive heat. The proximal fiber ends can also deteriorate and become opaque if exposed to excessive heat.

It is accordingly desirable to maintain the interface between the light pipes and the illuminator at 50° C. or less for such plastic fibers. Various techniques have been used to cool the interface at the light receiving distal ends of the fiber optics bundle, including filters, fans, cold mirrors, masking mirrors with apertures, optical conductor rods and combination lens light couplers.

For example, reference may be had to U.S. Pat. Nos. 5,099,399; 5,259,056 and 5,513,291.

It is a principal object of the present invention to provide an illuminator system for plastic fiber bundle light guides of the aforementioned type manufactured by Rohm and Haas Company which have a soft pliable core wherein the fiber optics interface with the light source is fully protected from dirt, dust, water or other deposits or contaminates to thereby preserve the efficiency of the optical design and to further provide a system which truly maintains an optical fiber interface at less than 50° C.

This particular polymeric flexible light pipe is described as having a "pliable" core. It is observed that in the prior art such a core is sometimes referred to as being a "compressible" core. However, it is preferred to utilize the term "pliable" inasmuch as this term is believed to be more accurate in that the term "compressible" tends to convey that the material can be made more compact by the application of pressure, rather than being soft and pliable or putty like.

A further object of the present invention is to provide such an illumination system which is capable of transmitting light through such elongated light pipes with exceptional efficiency whereby an average light projection from the distal ends of the fibers can be expected of at least 150 lumens with expectations of even achieving a maximum in excess 190 lumens of transmitted light from each fiber.

SUMMARY OF THE INVENTION

The fiber optics illumination system of the present invention is provided for plastic fiber bundle light guides or light pipes of the type previously described wherein the fibers have pliable cores with at least one cladding sleeve.

The system includes an illuminator source for providing light projected along an axis. An elongated light guide comprising at least one plastic optical fiber, and more typically a bundle thereof, having a cladded pliable core is provided whereby the proximal light receiving end of the exposed pliable fiber core is pressed against one side face of a transparent plate. The pliable fiber core pressed against this one side face of the transparent plate is aligned in parallel with the light axis such that the illuminator source is positioned on the opposite side face of the transparent plate with light projecting towards this opposite side for proximal end illumination of the fiber core end through the transparent plate.

This opposite side face of the transparent place is provided with light reflecting capabilities on all surface areas of the plate which do not reveal the distal fiber end therethrough for illumination thereby providing a mirror mask to reflect untransmitted light, which also serves to reflect unwanted heat away from the proximal ends of the fiber or light pipe proximal ends.

Instead of a single fiber, more typically the light guide includes a bundled plurality of such fibers having their uncladded adjacent exposed and pliable proximal ends pressed against one side of the mirror mask for transmission of light through the transparent plate to these proximal ends.

The mirror mask seals, aligns and controls heating power lighting applications with the optical fibers. Light energy emitted, and not utilized for purposes of conduction in the optical fibers, strikes the mirrored surface of the mask and is reflected away without significant absorption that would otherwise result in destructive heat. Light striking the unmirrored center section of the mask passes through the transparent sheet directly to the optical fibers for transmission. Transmission characteristics of the fibers are enhanced by fiber contact of the pliable exposed proximal fiber end cores contacting or pressing against the one side or outside of the mirror mask. Light transmission is enhanced by this contact of the uncladded pliable core ends with the transparent plate. This contact seals the end of the fibers preventing dust accumulation which would result in heat generation and transmission loss. Additionally, minor flaring of the pliable optical proximal end cores generated by contact with the mirror mask plate reduces the gapping between adjacent fiber proximal ends thereby increasing light transmission efficiency into the fiber proximal ends for transmission through the bundle.

An alignment collar or fixture is provided for retaining the proximal fiber ends in bundled alignment and an adjustable vice mechanism is provided for adjusting the spacing between the mirror mask and this collar for thereby adjusting the pressure of engagement of the uncladded proximal fiber ends against the one side or outside of the mirror mask.

This mirror mask and the uncladded proximal fiber ends which engage the mask are preferably contained within a sealed housing to prevent contamination of the mirror mask.

An air circulation cooling system may also be provided in this sealed housing for cooling the mirror mask and proximal fiber ends.

BRIEF DESCRIPTION OF THE DRAWINGS

Other objects and advantages appear hereinafter in the following description and claims. The accompanying drawings show, for the purpose of exemplification, without limiting the invention or claims thereto, certain practical embodiments illustrating the principals of the present invention, wherein:

DETAILED DESCRIPTION OF A PREFERRED EMBODIMENT

Figure 1:
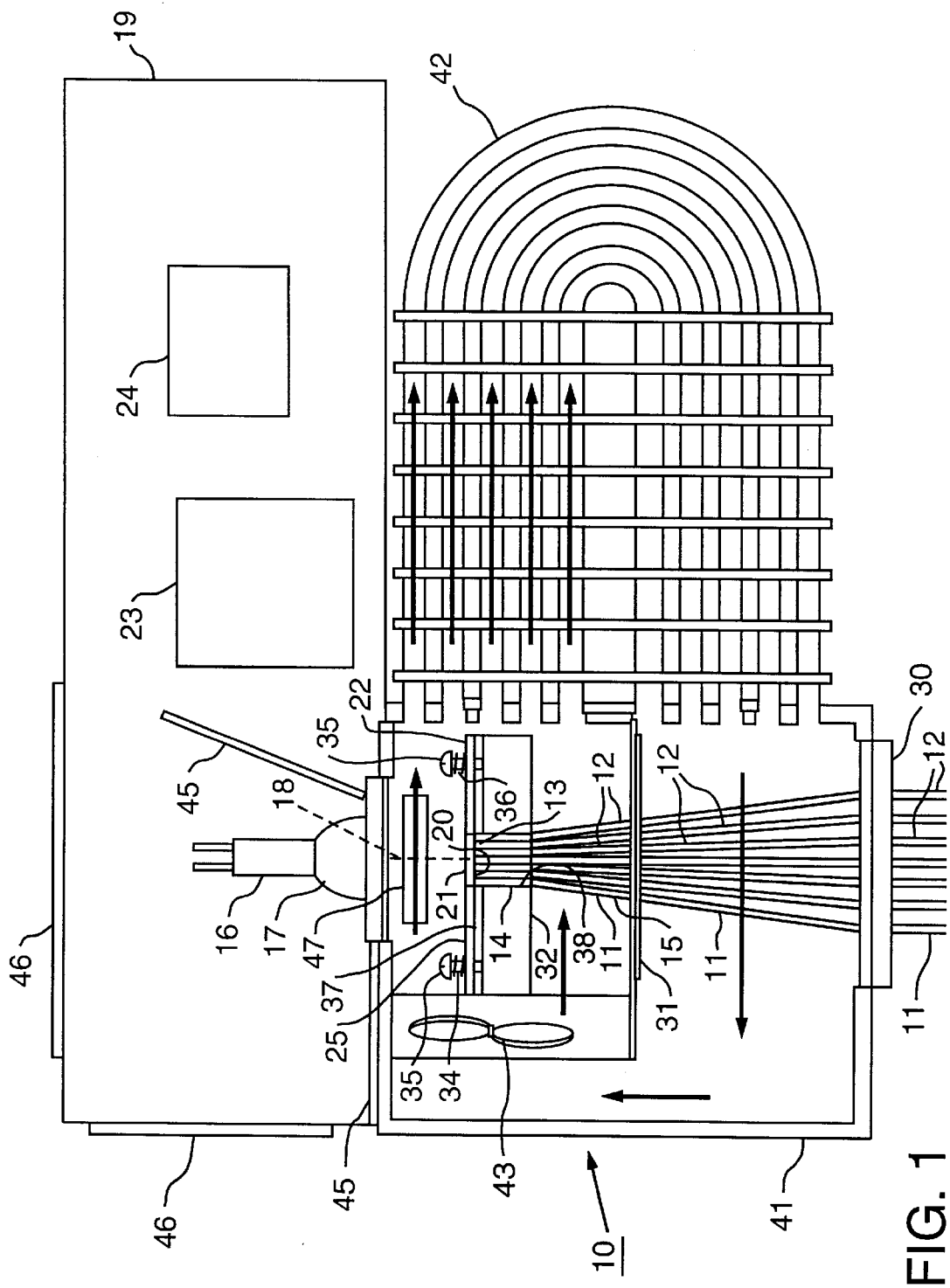
FIG. 1 is a schematic plan view of a preferred embodiment of the fiber optics illumination system of the present invention.
Figure 2:
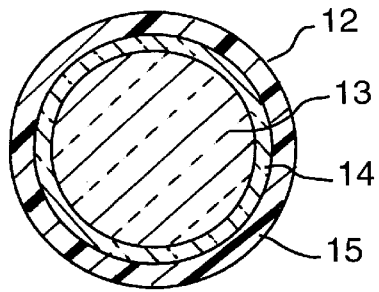
FIG. 2 is an enlarged view in vertical cross section of the plastic optical fiber light pipe used in the illumination system of FIG. 1.

Referring to FIG. 1, the fiber optics illumination system 10 of the present invention is intended for illumination of a plastic fiber bundle light guide 11 made up of individual plastic fiber light guides or pipes which have pliable cores with at least one cladding sleeve. The characteristics of this type of light pipe is illustrated in FIG. 2.

The individual plastic fiber light pipes or light guides 12 are elongated fibers having a central transparent core 13 of a soft pliable and transparent polymeric substance as previously explained. The particular light pipe utilized in the present embodiment of the invention disclosed is Optiflex flexible light pipe designated 7100-IEWS light pipe by Rohm and Haas Company wherein the light pipe transmission diameter is 7 mm.

The soft elongated pliable core 13 is provided with a first transparent outer sleeve of flexible Teflon 14 and an outer cladding 15 of flexible nontransparent white plastic.

An illuminator source 16 is provided which is a high intensity metal halide 150 watt lamp with parabolic reflector 17 which provides light projected along axis 18 from reflector 17.

The metal halide lamp 16 is energized in conventional fashion from the electronics schematically illustrated within housing 19. A ballast transformer 23 and a ballast capacitor 24 included in the electronics are schematically illustrated. The electrical energization of lamp 16 is not illustrated in detail since it is well known in the industry.

Figure 3:
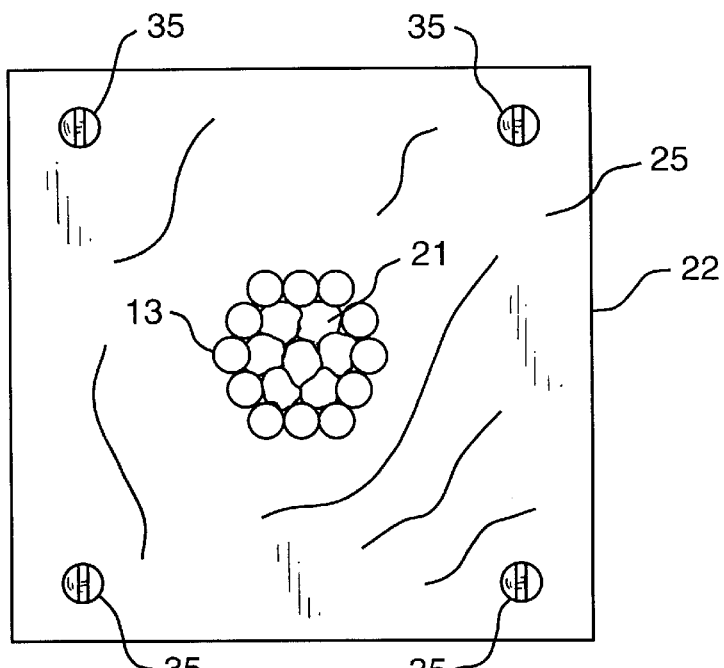
FIG. 3 is an enlarged front view in side elevation of the mirror mask utilized in the illumination system of the present invention as depicted in FIG. 1 and as seen from the light source in the direction transmission.
Figure 4:
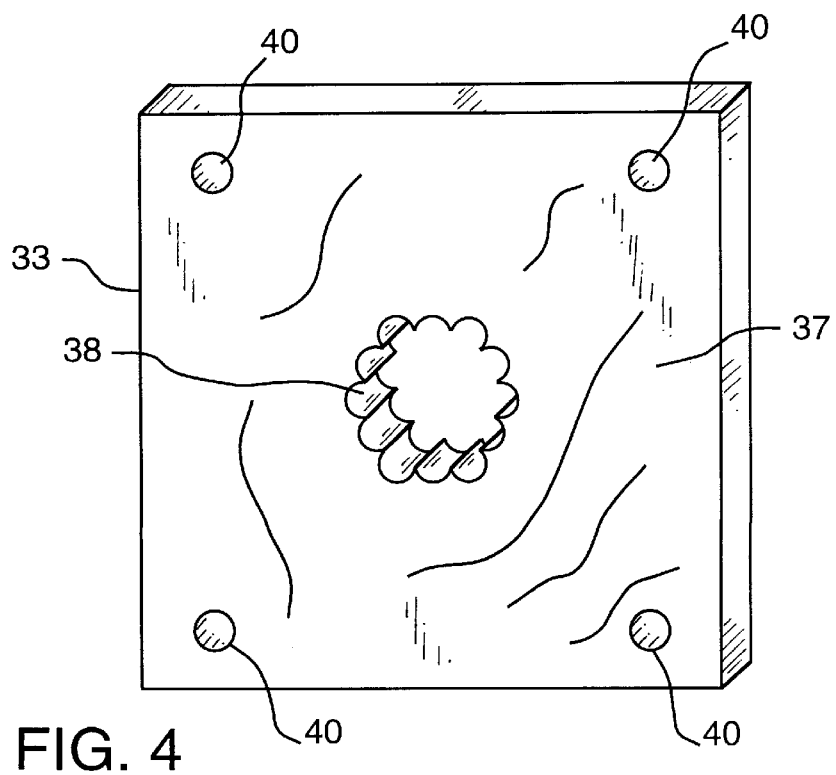
FIG. 4 is an enlarged perspective view of the alignment fixture shown in the illumination system of FIG. 1 in front view as seen from the direction of the light source.

Mirror mask 22 is comprised of a transparent glass plate which permits light striking the unmirrored center section 21 to pass directly therethrough to the optical fiber ends 14 for transmission. As previously explained, transmission characteristics of the fibers 12 are enhanced by fiber core aligned surface contact with the transparent side 20 of mirror mask 22. This contact seals the ends of the fibers cores preventing dust accumulation which would otherwise result in heat generation and transmission loss. Minor flaring of the optical fibers generated by contact with the mirror mask at surface 20 also desirably occurs thereby reducing the gapping between fibers thereby allowing for maximum life absorption into the fiber core ends 13. This is more readily apparent from viewing FIG. 3. The transmitted light which strikes the mirrored surface 25 of the mask is reflected away without significant absorption thereby which would otherwise result in destructive heat accumulation. This opposite inside face 25 of the mirror mask is provided with light reflecting capabilities on those surface areas of the mask 22 which do not reveal the distal fiber ends 13 therethrough for fiber illumination, whereby all light not transmitted from the light source to the distal fiber ends 13 from the illuminator source 16 is reflected.

The light guide 11 is composed of a bundled plurality of the aforedescribed plastic fibers or light pipes 12 which have their uncladded adjacent pliable proximal ends 14 pressed against outside face 20 of transparent plate 21 of mirror mask 22. The light guide bundle 11 exits from strain relief fixture 30 and continues on to a remote location for illumination of a desired object or objects.

Strain relief block or fixture 30 is provided with 19 independent passages therethrough arranged in a circular grouping to independently and respectively receive and retain in the passages the cladded light pipes 12. There are 19 light pipes 12 in the bundle 11 for the 19 strain relief passages within strain relief fixture 30.

In similar fashion, a second strain relief fixture 31 provides additional strain relief support of the bundle 11 of cladded light pipes 12. However, the light pipes 12 in bundle 11 are here converging and the strain relief passages provided through fixture 31 are therefore in a narrower grouping than those of strain relief fixture 30.

Beyond alignment fixture 31 the bundle of cladded fibers or light pipes 12 further converge to a tight bundle at the outer face 32 of alignment collar or fixture 33.

At this point the outer white plastic cladding 12 is removed and the remainder of the light pipes including their inner pliable core 13 and Teflon claddings 14 extend through alignment fixture 33 in a closely grouped bundle to firmly retain this bundle together and align the exposed proximal ends of the pliable light pipe cores 13 with the light source 16 and the outside surface 20 of mirror mask 22.

Between alignment fixture 33 and mirror mask 22, the middle cladding of Teflon 14 is removed or stripped from the pliable inner cores 13 and the proximal ends of the soft pliable inner cores 13 are engaged with or pressed against the outside face 20 of mirror mask 22. This engagement pressure is regulated by adjustable vice mechanism 34 which is comprised of the combination of alignment fixture 33, mirror mask 22, and the four spaced vice adjustment screws 35 with their respective compression springs 36.

Alignment fixture 33 is approximately one inch thick and is constructed of clear plastic and the inside surface 37 thereof is mirrored but need not be. Close proximity of the bundle within the central passage 38 of alignment block 33 enables the exposed pliable cable ends 13 to withstand pressure from the mirror mask 22. The inside surface of passage 38 may also be mirrored. The clear or mirrored material of the alignment fixture permits the dissipation of light which might otherwise escape transmission.

By adjusting machine screws 35 which are threadably received within respective passages 40 of alignment fixture 33, the pressure of compression springs 36 may be adjusted to precisely adjust the pressure of transparent outside surface 20 of mirror mask 22 against the bundled ends 13 of soft pliable bundled proximal light fiber core ends.

The housing portion 41 which directly contains the mirror mask 22 and uncladded proximal fiber ends 13 is completely sealed to prevent contamination from external elements such as dust.

An air circulation cooling system is also provided by a heat exchanger 42, which is a sealed part and parcel of sealed housing 41, is provided to circulate air as indicated by the arrows from the interface between mirror mask 22 and proximal fiber core ends 13 through heat exchanger 42 wherein the heat is dissipated to the ambient atmosphere. To assist in air circulation, a ventilation fan 43 is provided to forcibly circulate the air as indicated. However, in actual prototype experimental production it was discovered that the use of fan 43 was not even required and when turned off the fiber ends 13 were not damaged and in fact light transmission through the light pipes 12 even increased.

In order to further keep the heat emanating from side surfaces of light fixture 16 away from the internal parts of sealed housing 41, mirrors 45 are provided adjacent the body structure of illuminator 16 in electrical housing 19 to reflect light and heat away from housing 41 to heat sinks 46 for dissipation.

Infrared (IV), UV and color filters 47 may be added as desired or required.

I claim:

1. A fiber optics illumination system for plastic fiber bundle light guides wherein the fibers have pliable cores with at least one cladding sleeve, said system comprising:

an illuminator source for providing light projected along an axis;

an elongated light guide comprising at least one plastic optical fiber having a cladded pliable core and including a proximal light receiving end and a distal light emitting end;

a mirror mask including a transparent plate having inside and outside faces with an uncladded proximal end of said at least one pliable fiber core pressed against the outside face and said illuminator source positioned on the inside of said plate with the light axis projecting toward said inside face for proximal end illumination of said light guide through said transparent plate;

said inside face of said mirror mask having light reflecting capabilities on surface areas thereof which do not reveal said at least one proximal fiber end therethrough for fiber illumination whereby light not transmitted to said light guide from said illuminator source is reflected.

2. The fiber optics illumination system of claim 1 wherein said light guide includes a bundled plurality of said fibers having their uncladded adjacent pliable proximal ends pressed against said outside surface of said mirror mask.

3. The fiber optics illumination system of claim 2 including an alignment fixture retaining said proximal fiber ends in bundled alignment and an adjustable vise mechanism for adjusting the spacing between said mirror mask and said alignment fixture for thereby adjusting the pressure of engagement of said uncladded proximal fiber ends against said outside of said mirror mask.

4. The fiber optics illumination system of claim 2, including a sealed housing containing said mirror mask and said uncladded proximal fiber ends.

5. The fiber optics illumination system of claim 4 including an air circulation cooling system in said housing for cooling said mirror mask and proximal fiber ends.

6. A fiber optics illumination system for plastic fiber bundle light guides wherein the fibers have pliable cores with at least one cladding sleeve, said system comprising:

an illuminator source for providing light projected along an axis;

an elongated light guide comprising at least one plastic optical fiber having a cladded pliable core and including a proximal light receiving end and a distal light emitting end; and a transparent plate having inside and outside faces with an uncladded proximal end of said at least one pliable fiber core pressed against the outside face and said illuminator source positioned on the inside of said plate with the light axis projecting toward said inside face for proximal end illumination of said light guide through said transparent plate.

7. The fiber optics illumination system of claim 6, including a mechanism for maintaining pressure of engagement of said at least one uncladded proximal fiber end with said inside face of said plate under spring bias.

8. The fiber optics illumination system of claim 6, wherein said light guide includes a bundled plurality of said fibers having their uncladded adjacent pliable proximal ends pressed against said outside surface of said transparent plate.

9. The fiber optics illumination system of claim 8, including an alignment fixture retaining said proximal fiber ends in bundled alignment and an adjustable vice mechanism for adjusting the spacing between said transparent plate and said alignment fixture for thereby adjusting the pressure of engagement of said uncladded proximal fiber ends against said outside of said transparent plate.

10. The fiber optics illumination system of claim 8, including a sealed housing containing said transparent plate and said uncladded proximal fiber ends.

11. The fiber optics illumination system of claim 10, including an air circulation cooling system in said housing for cooling said transparent plate and proximal fiber ends.

12. The fiber optics illumination system of claim 6, wherein the inside face of said transparent plate has light reflecting capabilities on surface areas thereof which do not reveal said at least one proximal fiber end therethrough for fiber illumination whereby light not transmitted to said light guide from said illuminator source is reflected.

* * * * *